E. SEAVEY.
FILTER.
APPLICATION FILED SEPT. 28, 1912.
1,061,928. Patented May 13, 1913.
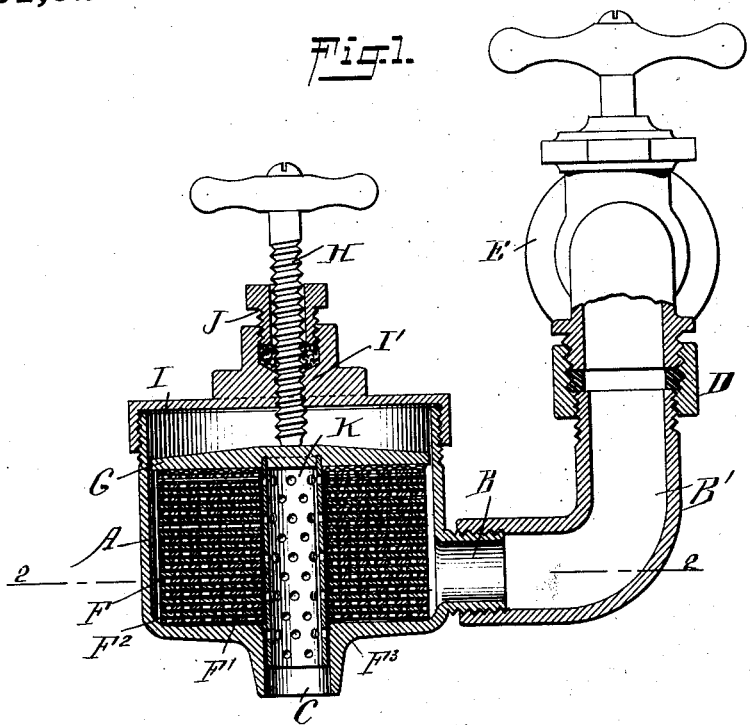
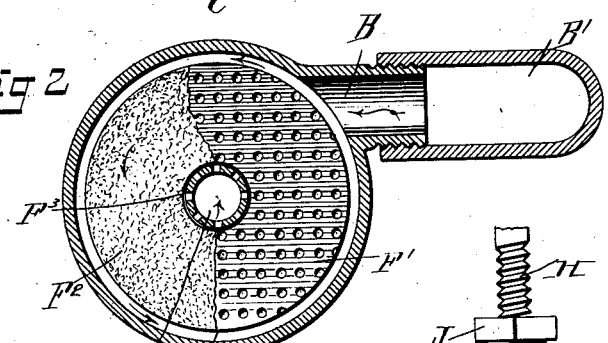
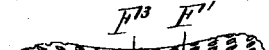
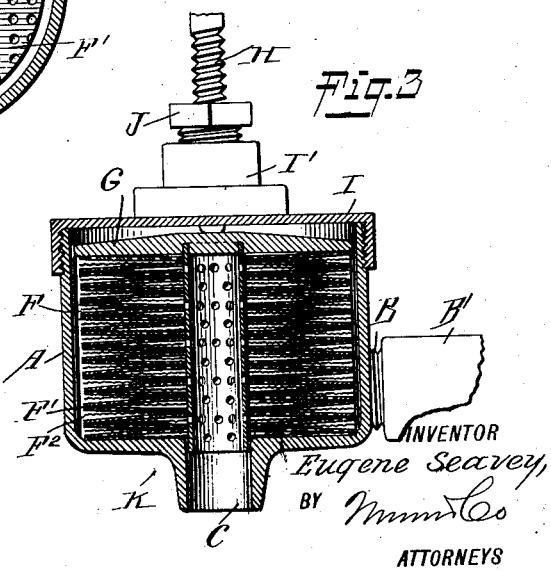
WITNESSES
INVENTOR
Eugene Seavey,
BY
ATTORNEYS

UNITED STATES PATENT OFFICE.

EUGENE SEAVEY, OF NEW YORK, N. Y.

FILTER.

1,061,928.   Specification of Letters Patent.   Patented May 13, 1913.

Application filed September 28, 1912. Serial No. 722,943.

*To all whom it may concern:*

Be it known that I, EUGENE SEAVEY, a citizen of the United States, and a resident of the city of New York, borough of Manhattan, in the county and State of New York, have invented a new and Improved Filter, of which the following is a full, clear, and exact description.

The invention relates to filters such as shown and described in the Letters Patent of the United States, No. 1,035,248, granted to me on August 13, 1912.

The object of the present invention is to provide a new and improved filter, which is simple and durable in construction, arranged to insure thorough straining of the sediment or other foreign matter contained in the liquid to be filtered, and to permit of readily cleaning the filter whenever it is desired to do so. For the purpose mentioned use is made of a filtering medium formed of alternately arranged perforate spring metal disks and fabric disks, of which the spring metal disks are curved or arched and capable of flattening on application of pressure and also capable of returning to curved position on release of pressure.

A practical embodiment of the invention is represented in the accompanying drawings forming a part of this specification in which similar characters of reference indicate corresponding parts in all the views.

Figure 1 is a sectional side elevation of the filter attached to a faucet; Fig. 2 is a sectional plan view of the same on the line 2—2 of Fig. 1; Fig. 3 is a sectional side elevation of the filter with the disks in released position for cleaning purposes; Fig. 4 is a perspective view of one of the perforated metal disks; and Fig. 5 is a similar view of one of the fabric disks.

The casing A of the filter is provided at one side with an inlet B and at the bottom with a suction outlet C, and the said inlet B is connected by a pipe B' with a coupling D for coupling the filter to the discharge spout of a faucet E or a similar device through which passes the liquid to be filtered. Within the casing A is arranged a filtering medium F formed of alternating superimposed disks F', F² arranged in a stack, and of which the disks F' are perforated and made of non-corrodible sheet metal, curved or arched, as indicated in Fig. 3. The disks F² are made of fabric material such as felt, flannel or a like textile material. The lowermost disk F' of the stack rests on the bottom of the casing A and the uppermost disk of the stack is engaged by a presser plate G for pressing the stack of disks so that the normally curved or arched disks F' are flattened out, and the disks F', F² are firmly superimposed one upon the other. When the pressure of the presser plate G is released the metal disks F' by their own resiliency return to curved or arched position, thus practically separating the disks F', F² for conveniently cleaning the same without removing the filtering material from the casing A, as hereinafter more fully described. The presser plate G is engaged at the back by a screw rod H screwing in a nut I' secured to or forming part of a cap I screwed or otherwise fastened to the upper open end of the casing A. A packing gland J screws on the nut I' to pack the screw rod H with a view to prevent leakage of the liquid by way of the screw rod H and its nut I'. A perforated tube K is secured centrally to the under side of the presser plate G and this tube I extends through central apertures F³ formed in the disks F', F² of the filtering medium F, and the lower end of the tube K extends into the outlet C. By reference to the drawings it will be noticed that the disks F', F² are somewhat less in diameter than the inside diameter of the casing A so as to form an annular space between the peripheral face of the filtering medium F and the inner surface of the casing, and into this annular space opens the inlet B, approximately tangential thereto, so that a whirling motion is given to the liquid passing into the casing A. It will be noticed that the liquid passing into the annular space between the filtering medium F and the casing A can filter through the disks E² and from one to the other by way of the perforations in the disks F', the liquid finally passing through the perforations of the tube K into the latter to be discharged into the outlet C, from which the filtered liquid may pass to a suitable receptacle held below the outlet. It is understood that the tube K forms a conductor for the filtered liquid and serves to hold the disks F', F² in central position within the casing A.

When it is desired to clean the filter it is only necessary for the operator to retract the screw rod H so that the disks F' return from their flattened position by their own resiliency into curved position, whereby the disks F', F² are practically separated from each other. A cleaning and washing liquid is now passed by way of the inlet B into the casing A to wash the disks F', F² free of sediment and other foreign matter, said wash water and extraneous matter passing into the tube K and finally out of the outlet C to a suitable place of discharge. After the disks F' and F² have been cleaned of impurities the wash water is shut off from the casing A and the screw rod H is again screwed downward so as to cause the presser plate G to press the filtering medium, that is, to flatten out the metallic disks F' and to compactly superimpose the disks F', F². The filter is then again ready for use.

When it is desired to replace the disks F² of the filtering medium F by new ones, the operator retracts the screw rod H and unscrews the cap I to permit removing the presser plate G and the filtering medium F from the casing A. The disks F' and F² can now be readily separated and the disks F² replaced by new ones. The filtering medium is then replaced in the casing A and likewise the presser plate G and its tube K, after which the cap is replaced and the screw rod H screwed down to compress the filtering medium, as previously explained.

Having thus described my invention, I claim as new and desire to secure by Letters Patent:

1. A filter, comprising a casing having an inlet and an outlet, a filtering medium in the said casing and interposed between the inlet and outlet, the filtering medium being formed of a stack of alternately arranged spring metal disks and fabric disks, the spring metal disks being curved and capable of flattening on application of pressure and capable of returning to curved shape on release of pressure, and means for pressing the disks together.

2. A filter provided with a filtering medium formed of a stack of alternating perforated metal disks and fabric disks, the metal disks being curved and capable of flattening on application of pressure and capable of returning to curved shape on release of the pressure to separate the metal and fabric disks.

3. A filter, comprising a casing having an inlet and an outlet, a filtering medium in the said casing interposed between the said inlet and outlet, the said filtering medium being formed of alternately arranged spring metal disks and fabric disks, the disk having central registering apertures in register with the said outlet, and the stack of disks forming with the said casing an annular space into which opens the said inlet.

4. A filter, comprising a casing having an inlet and an outlet, a filtering medium in the said casing interposed between the said inlet and outlet, the said filtering medium being formed of alternately arranged spring metal disks and fabric disks, the disks having central registering apertures in register with the said outlet and the stack of disks forming with the said casing an annular space into which opens the said inlet, the said spring metal disks being curved, and a movable presser plate engaging one end of the stack of disks, the other end of the stack resting on the casing.

5. A filter, comprising a casing having an inlet and an outlet, a filtering medium in the said casing interposed between the said inlet and outlet, the said filtering medium being formed of alternately arranged spring metal disks and fabric disks, the disks having central registering apertures in register with the said outlet and the stack of disks forming with the said casing an annular space into which opens the said inlet, the said spring metal disks being curved, a movable presser plate engaging one end of the stack of disks, the other end of the stack resting on the casing, and a perforate tube attached to the presser plate and extending within the registering central apertures of the stack of the disks, the said tube opening into the said outlet.

In testimony whereof I have signed my name to this specification in the presence of two subscribing witnesses.

EUGENE SEAVEY.

Witnesses:
THEO. G. HOSTER,
PHILIP D. ROLLHAUS.